United States Patent [19]
Fairfield et al.

[11] Patent Number: 5,323,664
[45] Date of Patent: Jun. 28, 1994

[54] SLIDEBAR ASSEMBLY FOR ATTACHING A HANDLEBAR TO THE HANDLEBAR STEM OF A BICYCLE OR THE LIKE

[76] Inventors: Ron Fairfield, 2047 Lucas St., San Fernando, Calif. 91340; Michael Holligan, 2133 NE. 13th St., Portland, Oreg. 97212

[21] Appl. No.: 824,255

[22] Filed: Jan. 21, 1992

[51] Int. Cl.⁵ .................... B62K 21/12; B62K 21/16
[52] U.S. Cl. .................... 74/551.3; 74/551.1; 74/551.2; 74/551.6
[58] Field of Search ............ 74/551.3, 551.1, 551.2, 74/551.5, 551.6, 551.7

[56] References Cited

U.S. PATENT DOCUMENTS

| | | | |
|---|---|---|---|
| 561,329 | 6/1896 | Leonard | 74/551.6 |
| 575,879 | 1/1897 | Dunn | 74/551.5 |
| 586,262 | 7/1897 | Woodman | 74/551.6 |
| 671,647 | 4/1901 | Field | 74/551.6 |
| 677,428 | 7/1901 | Spencer | 74/551.5 |
| 689,217 | 12/1901 | Palmer | 74/551.3 |
| 3,408,090 | 10/1968 | Fritz et al. | 280/278 |
| 3,477,741 | 11/1969 | Ross | 280/279 |
| 4,023,436 | 5/1977 | Dodge | 74/551.3 |
| 4,250,770 | 2/1981 | Robertson, Jr. | 74/551.8 |
| 4,390,300 | 6/1983 | Foster | 403/24 |
| 4,493,225 | 1/1985 | Galahad | 74/551.3 |
| 4,682,509 | 7/1987 | Takamiya et al. | 74/551.4 |
| 4,729,255 | 3/1988 | Moulton | 74/551.3 |
| 4,824,131 | 4/1989 | Thay | 280/278 |
| 4,930,798 | 6/1990 | Yamazaki et al. | 280/261 |
| 5,121,652 | 6/1972 | Morrone | 74/551.3 |

FOREIGN PATENT DOCUMENTS

| | | | |
|---|---|---|---|
| 50059 | 3/1935 | Denmark | 74/551.3 |
| 67343 | 7/1948 | Denmark | 74/551.3 |
| 381805 | 8/1990 | European Pat. Off. | 74/551.1 |
| 1101558 | 10/1955 | France | 74/551.1 |
| 728898 | 12/1966 | Italy | 74/551.3 |
| 65316 | 3/1950 | Netherlands | 74/551.3 |

Primary Examiner—Leslie A. Braun
Assistant Examiner—Andrea Pitts
Attorney, Agent, or Firm—Donald L. Beeson

[57] ABSTRACT

A slidebar assembly for adjustably positioning the handlebar of a bicycle or other similar vehicle includes a slidebar having a base end which pivotally attaches to the head of the bicycle stem and a slide block assembly which carries the handlebar on the slidebar so that the forward position of the handlebar can be adjusted in a slide motion. Hand accessible cam lock levers are provided on the slide block assembly for releasing the grip of the slide block assembly on the slidebar; a further hand-accessible cam lock lever is provided at the base of the slidebar for adjusting the pivot angle of the slidebar in relation to the handlebar stem which fits into the frame of the bicycle. Adjustment of the pivot angle of the slidebar in relation to the bicycle stem is provided by means of unique cam lock mechanism, which, when the cam lock lever at the base end of the slidebar is actuated, operatively releases the base end to pivot on the head of the handlebar stem. Due to the hand-accessible nature of the slide and pivot adjustments on the slidebar, the handlebar can be repositioned without the use of tools as the cyclist is riding the bicycle.

14 Claims, 4 Drawing Sheets

SLIDEBAR ASSEMBLY FOR ATTACHING A HANDLEBAR TO THE HANDLEBAR STEM OF A BICYCLE OR THE LIKE

BACKGROUND OF THE INVENTION

The present invention generally relates to handlebar systems for bicycles or similar vehicles, and more particularly to attachments which permit adjustment of the handlebar position relative to the rider of the bicycle.

Handlebar position is important to a cyclist in terms of both riding comfort and efficient operation of the bicycle. The optimum position of the handlebar will vary depending on terrain and riding conditions, for example, a steep terrain or rugged terrain may call for a more forward position to the handlebar to achieve greater balance and power, while cruising on a relatively flat terrain may dictate a more upright position for long term comfort.

Heretofore, handlebar position adjustments have been possible, but only to a limited degree. Conventional adjustments include vertically adjusting the handlebar stem in the neck of the bicycle frame by loosening the stem wedge nut with a crescent wrench or other similar hand tool. Other conventional adjustments include rotating the handlebar at the end of the handlebar stem. In either case, the degree of adjustment is relatively limited. Particularly, such conventional adjustment methods provide minimal forward and rearward adjustment capability and have the further hold the slide block assembly in its sliding engagement with the slidebar; the other is a handlebar clamping means which holds the handlebar in transverse relation to the slidebar.

Release means on the slide block assembly permit hand adjustments to be made to the position of the handlebar. Preferably the release means are comprised of hand accessible cam lock levers which operate to disengage the slide block assembly's grip on both the slidebar and the handlebar. Alternative hand accessible release means might include the use of hand operated turn tight bolts.

A further aspect of the invention involves the adjustment of the pivot angle of the slidebar in relation to the handlebar stem to achieve elevational (up/down) adjustments of the handlebar. In accordance with the invention, this is accomplished by a pivot means which includes providing a handlebar stem with a split stem head and a hand operated cam lock means which is operative to spread the two halves of a split stem head so as to lock the stem head to the slidebar.

It will be seen that because of hand accessible adjustments, moving the handlebar forward or backward along the slidebar in a linear motion can be easily accomplished, as can a rotational adjustment of the handlebar in the slide block assembly which carries the handlebar. Furthermore, as above-mentioned, the slidebar can be pivotally adjusted up and down relative to the bicycle stem to raise or lower the handlebar. Any of these disadvantage of requiring the cyclist to stop and dismount his or her bicycle before the adjustment is made.

The present invention improves on conventional handlebar adjustment schemes by providing an attachment which provides a greater degree of adjustment, including a linear forward adjustment of the handlebar. Using the attachment of the present invention, a cyclist can readily reposition the handlebar either forward or backward or up and down, and do so by hand, i.e., without tools, and while riding the bicycle.

SUMMARY OF THE INVENTION

Briefly, the invention involves using a slidebar assembly to hold the bicycle handlebar to its bicycle frame to permit different handlebar adjustments including backward and forward slide adjustments, and up and down pivot adjustments. In respect to up and down pivot adjustments, the invention provides for a unique, easily hand actuated, cam lock means for pivotally attaching the slidebar assembly to the handlebar stem.

According to the invention, a slidebar assembly has an elongated slidebar, the base end of which mounts to the end of the bicycle's substantially vertical handlebar stem. The bicycle handlebar is attached to the slidebar by a releasable slide means preferably comprised of a slide block assembly having two clamping means: one clamping means is a slidebar clamping means operative to adjustments can be made by the cyclist while riding the bicycle.

It can therefore be seen that a primary object of the invention is to provide a slidebar assembly for holding the handlebar of a bicycle or similar vehicle wherein a greater than normal degree of adjustment can be achieved, and wherein hand adjustments which can be made by a riding cyclist. Yet other objects of the invention will become apparent from the following specification and claims.

DETAILED DESCRIPTION OF THE ILLUSTRATED EMBODIMENT

Figure 1:
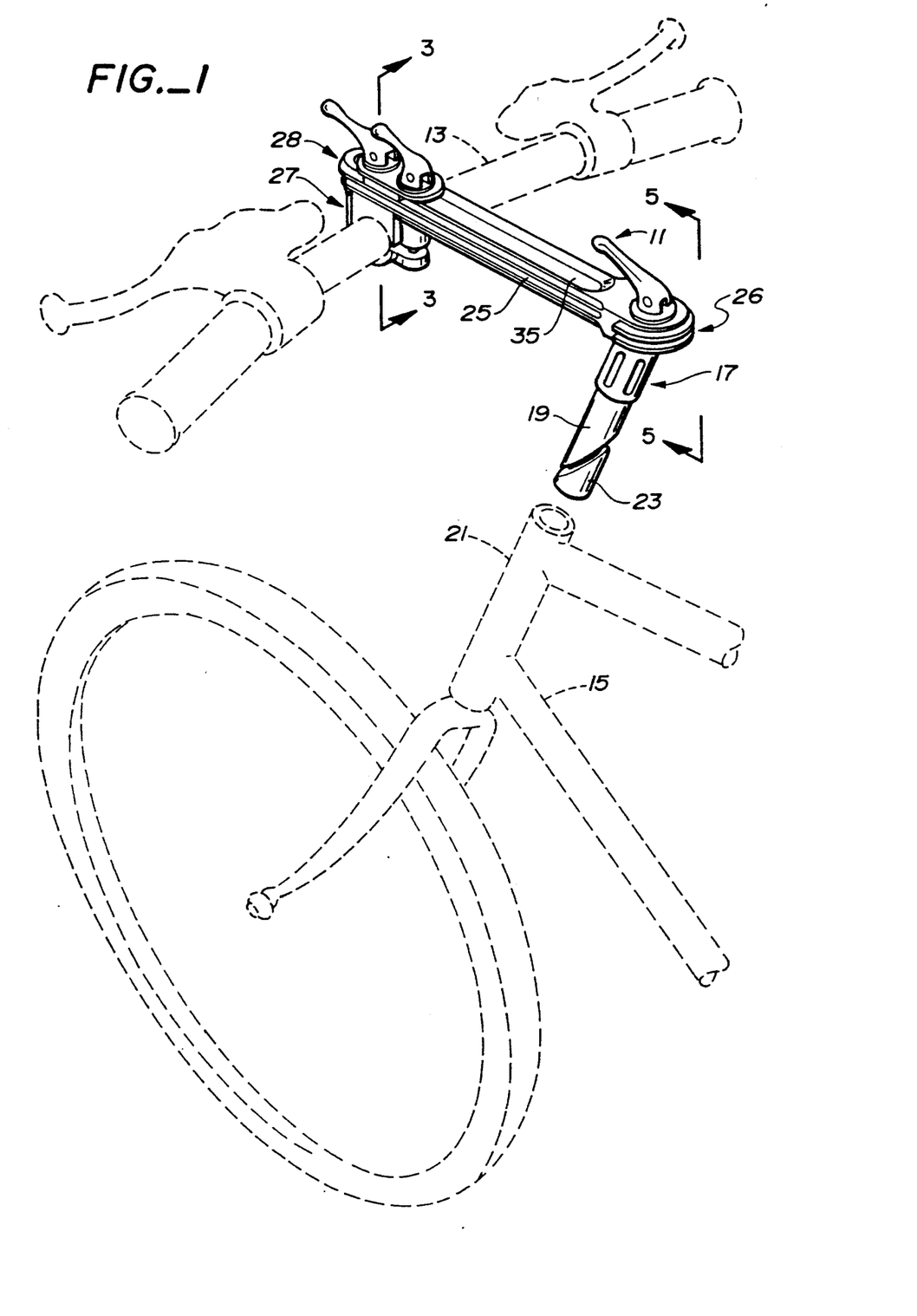
FIG. 1 is a perspective view of a slidebar and stem assembly in accordance with the invention, with the handlebar and bicycle frame being shown in phantom lines.

Referring now to the drawings, FIG. 1 generally shows a slidebar assembly 11 in accordance with the invention adjustably holding a handlebar 13 (shown in phantom lines) to a bicycle frame 15 (also shown in phantom lines) with the handlebar fully extended in a forward position. The slidebar assembly is secured to the head 17 of the handlebar stem 19 which in turn is releasably secured in the neck 21 of the bicycle frame by means of a conventional stem wedge locking mechanism 23. As will be more fully described below, the forward position of the handlebar will be adjustable over substantially the length of the slidebar assembly in addition to the slidebar assembly being pivotally adjustable on the stem head such that the handlebar can be raised and lowered. All adjustments ca readily be made without the use of tools by hand accessible adjustment levers.

Figure 2:
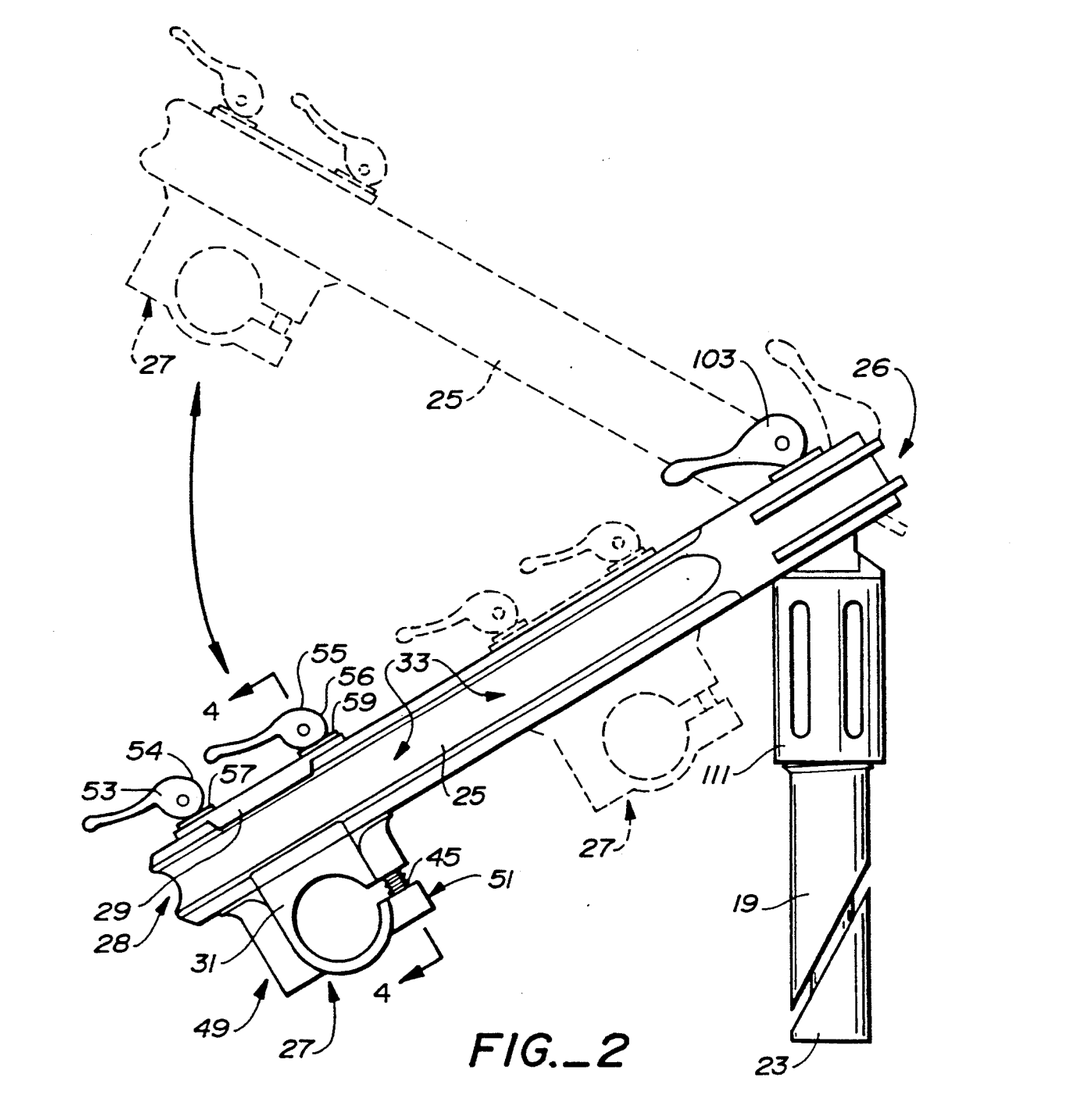
FIG. 2 is a side elevational view of a handlebar and stem assembly in accordance with the invention wherein various adjustment of the assembly are shown in phantom lines.

The slidebar assembly is seen to have two main operative parts: one is an elongated slidebar 25 having a base end 26 and a distal end 28; the other is a slide block assembly 27 which includes an upper slide block 29 and a lower slide block 31. As best shown in FIG. 2, the slide block assembly rides on an extended slide portion 33 of the slidebar such that it can be adjustably positioned therealong in a slide motion. In FIG. 2, the phantom line representation of the slide block assembly shows the block assembly moved from a forward position near the distal end of the slidebar backward in a slide motion toward the slidebar's base end.

In its illustrated construction, the slide portion 33 of the slidebar 25 has a central guide slot 35 bordered by slide surfaces comprised of top and bottom V-shaped runners 37, 39 which contact and act as clamping surfaces for the mating V-shaped slide surfaces 41, 42 of the upper and lower slide blocks of the slide block assembly. Other mating slide surface configurations, for example, flat surfaces, are possible, however, it is found that V-shaped slide surfaces have the advantage of constraining the side walls of the guide slot such that they do not distort or bow outwardly under an applied clamping force.

It will be seen that the upper and lower slide blocks 29, 31, in conjunction with a slide release means described below, provide a means whereby the slide block assembly can be releasably clamped in a fixed position to the slidebar. In addition to this slidebar clamping means, the slide block assembly also has a handlebar clamping means in the form of an opening 43 which extends through the body of its lower slide block member in a direction transverse to the slide block assembly's slide direction. This opening should be suitably sized to snugly receive the yoke of a standard size handlebar (typically one inch in diameter) whereby the handlebar can be clamped in position by a clamping force applied through the gap 45 in the aft end 51 of the lower slide block 31.

Figure 3:
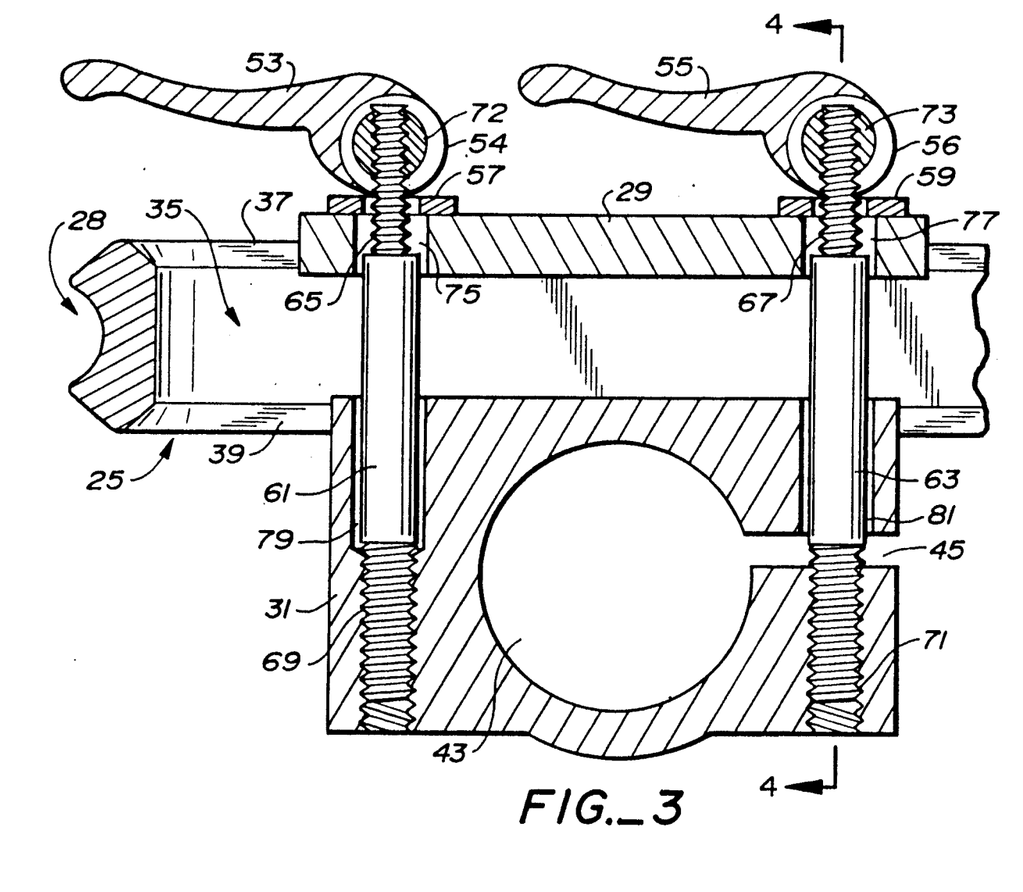
FIG. 3 is a partial, cross-sectional view of the slidebar assembly shown in FIG. 1 taken along section lines 3—3.
Figure 4:
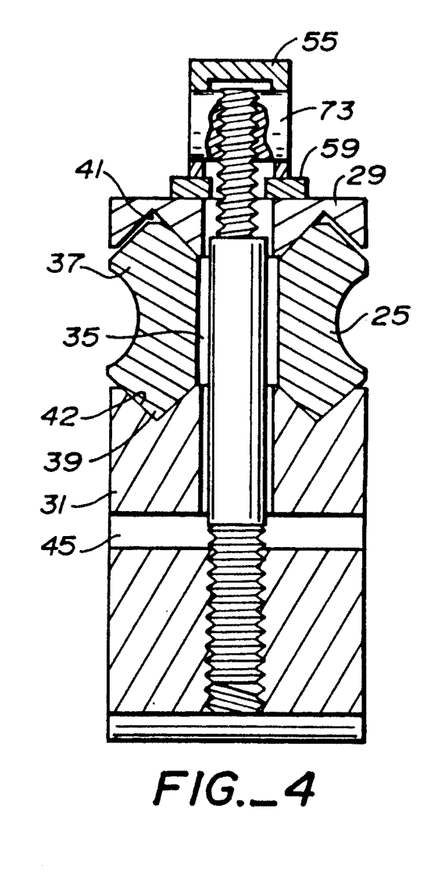
FIG. 4 is a cross-sectional view of the slidebar assembly shown in FIG. 3 taken along section lines 4—4.

The slide block assembly's slide release means operate to release not only the clamping engagement of the slide block assembly to the slidebar but also the engagement of the handlebar within the transverse opening through the lower slide block. FIGS. 3 and 4 illustrate the preferred embodiment of the release means. Shown are two cam lock mechanisms, one at the forward end 49 of the slide block assembly, and one at the aft end 51. Each cam lock mechanism consists of a cam lock lever 53, 55, a slip washer 57, 59 which serves as a footing for the cam surfaces 54, 56 of the cam lock lever, and a tie rod 61, 63 having top and bottom threaded ends 65, 67, and 69, 71 which, respectively, thread into the pivot posts 72, 73 of the cam lock levers, and into the bottom half of the lower slide block 31. The tie rods are seen to extend from the cam lock levers through guide holes 75, 77 in the upper slide block 29, down through the guide slot 35 of the slidebar, and from there through guide holes 79, 81 in the top half of the lower slide block.

It should be noted that the tie rod ends 65, 67 and 69, 71 have differential threads to facilitate proper installation of the cam lock levers. The cam lock levers are installed by simply screwing them down onto the top threaded ends 65, 67 of the tie rods after all the parts of the slide block assembly save for the cam lock levers have first been assembled on the slidebar. The differential threads will permit the handle of the cam lock levers to be properly aligned with the slide bar when the levers' cam surfaces 54, 56 contact the washers 57, 59.

It can readily be seen that actuation of the cam lock levers 53, 55 up or down will, respectively, loosen and tighten the upper and lower slide blocks 29, 31 against the slidebar so as to clamp the slide block assembly in a fixed position on the slidebar. At the same time, actuation of the aft cam lock lever 55 will loosen and tighten the handlebar within the transverse opening of the lower slide block. The forward and aft cam lock levers are easily reachable by the cyclist while riding the bicycle and can easily be actuated as required to adjust the position of the slide block assembly on the slidebar.

Figure 7:
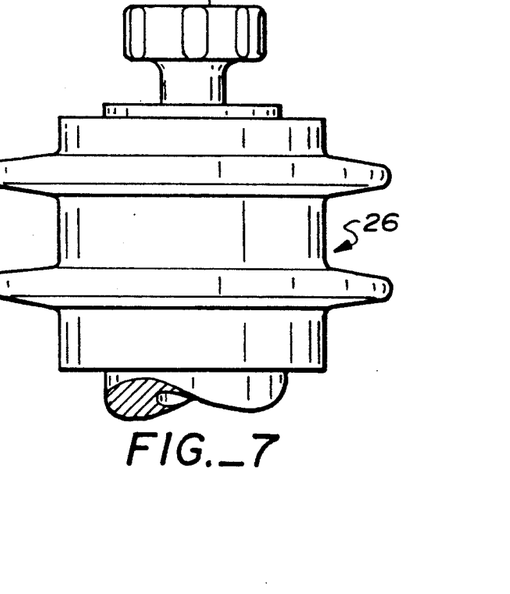
FIG. 7 is a partial rear elevational view of the slidebar assembly of the invention showing an alternative turn tight bolt for releasably holding the base end of the slidebar to the bicycle stem.

FIG. 7 illustrates a hand actuated turn tight bolt, that is, a hand turnable bolt, associated with the cam lock means for the slidebar pivot means described below. It will be appreciated that similar turn tight bolts can be used in place of the cam lock levers illustrated in FIGS. 3 and 4, that is, the cam lock levers associated with the slide block assembly. Due to the advance of the threaded end of the tie rod in the lower slide block, a turn on the turn tight bolts would cause the slide block assembly to clamp or release the slidebar.

Figure 5:
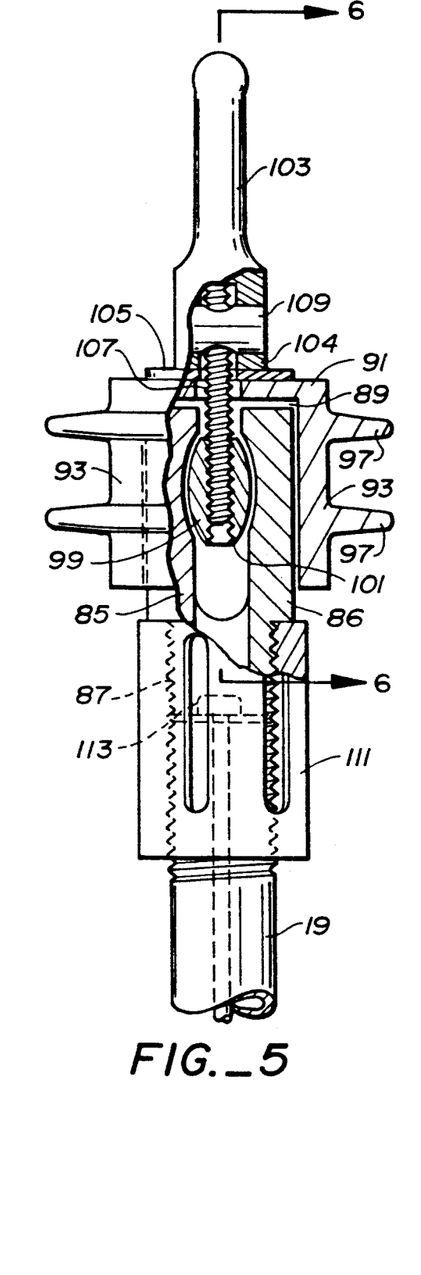
FIG. 5 is a partial cross-sectional view in rear elevation of the slidebar and stem assembly shown in FIG. 1 taken along section lines 5—5.
Figure 6:
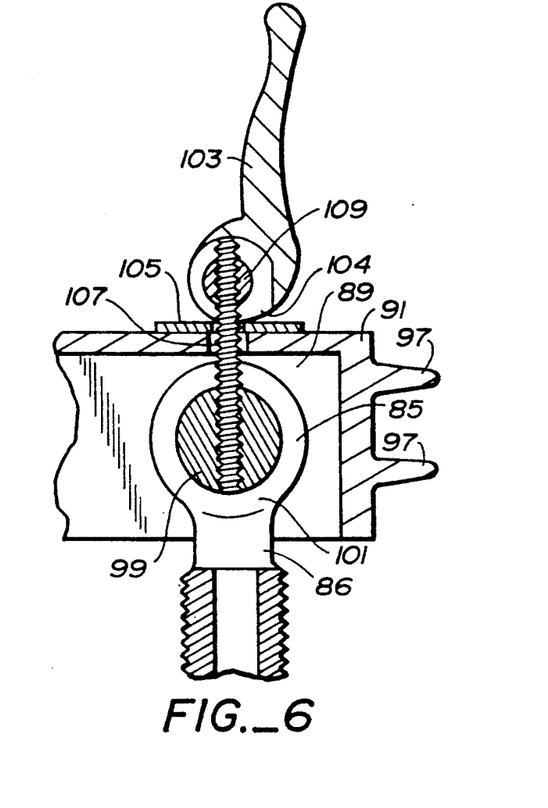
FIG. 6 is a fragmentary, cross-sectional view in side elevation of the slidebar and stem assembly shown in FIG. 5 taken along section lines 6—6.

FIGS. 5 and 6 show a slidebar pivot means, including cam lock means, which operates to releasably hold the base end 26 of the slidebar 25 to the head 17 of the handlebar stem and which permits the hand adjustment of the pivot angle of the slidebar (denoted by the arrow in FIG. 2) in relation to the stem. The cam lock means includes a split stem head having a separated section 85 which extends down into the threaded portion 87 of the stem, and an identical opposed section 86 integral with the stem head.

To attach the slidebar to the split head of the stem, the slidebar pivot means provides for capturing the solid stem head on the base end 26 of the slidebar. Specifically, the slidebar's base end has with a stem retaining channel 89 formed by a top wall 91 and side walls 93 which have been strengthened by reinforcement ribs 97. The retaining channel 89 receives the split head of the stem such that the split head can be expanded to lock the slidebar and stem together at a fixed pivot angle. To expand the split stem head the cam lock means includes a cam element in the form of an oval shaped knuckle ball 99 disposed in a correspondingly shaped cam channel 101 for the knuckle ball opposed longitudinally extending formed between the two sections 85, 86 of the split stem.

The cam lock means for the split stem head further comprises hand accessible and hand actuated means for releasably locking the cam element 99 in the cam channel 101 from the top of the slidebar. This includes a cam lock lever 103 disposed over the top wall 91 of the slidebar's stem retaining channel, a slip washer 105 which acts as a footing for the cam surface 104 of the cam lock lever, and a threaded tie rod 107 by which the knuckle ball in the knuckle ball channel is tied to the pivot post 109 of the cam lock lever.

The cam lock means operates to spread and lock the stem head in the stem retaining channel as follows: when the cam lock lever 103 is in its "up" position as shown in FIGS. 5 and 6, the knuckle ball 99 is pushed down to release the split stem within the stem retaining channel; as the cam lock lever is rotated to its "down" position, the cam surface 104 of the cam lock lever causes the knuckle ball to be pulled up within the knuckle ball channel causing the split stem to expand and lock into the channel and also causing a friction lock of the knuckle ball in the channel. As is the case with the cam lock lever associated with the slide block assembly on the slidebar, the cam lock lever for the slidebar pivot means is easily hand accessible and can be easily actuated up and down in a longitudinal motion to adjust this slidebar pivot position on the stem. As noted above, the hand accessible and hand actuated means for releasably locking the cam element 99 in the cam channel 101 may include a hand actuatable device other than a cam lever, such as a turn tight bolt 83 as illustrated in FIG. 7.

Installation of the handlebar stem and slidebar assembly can be accomplished by first assembling the separated sections 85, 86 of the split stem with the knuckle ball 99 in place in the knuckle ball channel 101 and screwing the stem nut 111 onto the threaded portion 87 of the stem to secure this assembly together. The stem assembly can then be inserted into the neck of the bicycle frame and locked into position by tightening the stem wedge Allen-head screw 113 by inserting an Allen wrench through the threaded hole in the knuckle ball which receives the threaded tie rod 107. After the stem wedge has been tightened, and after the slidebar 25 is attached to the stem head by inserting the stem head into stem retaining channel 89 at the base of the slidebar, the threaded tie rod 107 can be inserted through the top wall of the stem retaining channel and into the knuckle ball, and the slip washer 105 and cam lock lever 103 installed by screwing the cam lock lever onto the end of the tie rod until it reaches its slip washer footing on the slidebar.

To produce a relatively low cost and lightweight slidebar assembly in accordance with the invention, the slidebar and other parts of the assembly will preferably be fabricated of cast aluminum parts. Steel helicoil inserts can be provided in place of threaded holes to prevent the tendency of threads in aluminum material to strip out.

It can therefore be seen that the present invention provides a slidebar assembly which provides a slide adjustment of the handlebar of a bicycle or similar vehicle by means of easily reached, hand accessible cam lock levers or other similar release means, as well as a pivot adjustment which can be made in a similarly accessible manner. The invention permits infinitely variable adjustments of the handlebar both in a linear and pivotal motion without the use of tools; indeed, such adjustments can be accomplished while the cyclist is riding the bicycle. While the present invention has been described in considerable detail in the foregoing specification, it is understood that it is not intended that the invention be limited to such detail, except as necessitated by the following claims.

What we claim is:

1. A slidebar assembly for attaching a handlebar to a handlebar stem of a bicycle like vehicle comprising
   an elongated slidebar having a base end,
   a slide block assembly having a hand releasable slidebar clamping means operative to releasably hold said slide block assembly in sliding engagement to said slidebar and further having a handlebar clamping means for clamping a handlebar to said slide block assembly in transverse relation to said slidebar, said releasable slidebar clamping means including at least one hand accessible cam lock lever for releasably tightening the slidebar clamping means on said slidebar, and
   means for mounting the base end of said slidebar to a handlebar stem.

2. A slidebar assembly for attaching a handle bar to a handlebar stem of a bicycle-like vehicle comprising
   an elongated slidebar having a base end and at least one top slide surface and at least one bottom slide surface..
   a slide block assembly having an upper slide block and lower slide block for slidably engaging, respectively, the top and bottom slide surfaces of said slidebar, and a hand releasable slidebar clamping means accessible along the top slide surface of said slidebar and operative to releasably hold said slide block assembly in sliding engagement to said slidebar, said slide block assembly further having a handlebar clamping means for clamping a handlebar to said slide block assembly in transverse relation to said slidebar, and
   means for mounting the base end of said slidebar to a handlebar stem.

3. The slidebar assembly of claim 2 wherein the top and bottom slide surfaces of said slidebar are V-shaped runners and said upper and lower slide blocks have mating V-shaped slide surfaces.

4. A slidebar assembly for attaching a handlebar to a handlebar stem of a bicycle-like vehicle comprising
   an elongated slidebar having a base end,
   a slide block assembly having a hand releasable slidebar clamping means operative to releasably hold said slide block assembly in sliding engagement to said slidebar and further having a handlebar clamping means for clamping a handlebar to said slide block assembly in transverse relation to said slidebar, and
   means including pivot support means for mounting the base end of said slidebar to a handlebar stem, said pivot support means being operative to pivotally adjust the angle of said slidebar in relation to said handlebar stem and including a cam lock means for releasably fixing the angle of said slidebar.

5. The slidebar assembly of claim 4 wherein said cam lock means is hand actuated at the top of said slidebar.

6. A slidebar assembly for slidably attaching a handlebar to a handlebar stem of a bicycle-like vehicle comprising
   an elongated slidebar having a base end, a distal end, a top slide surface and a longitudinally extending guide slot between said base and distal ends,
   a slide block assembly extending through said guide slot having a slidebar clamping means operative to hold said slide block assembly in sliding engagement with said slidebar and in guiding relation with said guide slot, a handlebar clamping means for clamping a handlebar to said slide block assembly in transverse relation to said slidebar, and hand actuated slide release means for releasably securing said slide block assembly in a fixed position along said guide slot, and slide release means being disposed at the top slide surface of said slidebar so as to be hand accessible, and
   means for mounting the base end of said slide bar to a handlebar stem.

7. A slidebar assembly for slidably attaching a handlebar to a handlebar stem of a bicycle-like vehicle comprising an elongated slidebar having a base end, a distal end, and a longitudinally extending guide slot between said base and distal ends, and top slide surfaces and bottom slide surfaces on either side of said guide slot, a slide block assembly having a slidebar clamping means operative to hold said slide block assembly in sliding engagement with said slidebar and in guiding relation with said guide slot, said slide block assembly including an upper slide block and lower slide block for slidably engaging, respectively, the top and bottom slide surfaces of said slidebar, a handlebar clamping means for clamping a handlebar to said slide block assembly in transverse relation to said slidebar, and hand actuated slide release means for releasably securing said slide block assembly in a fixed position along said guide slot, and means for mounting the base end of said slidebar to a handlebar stem, said release means being accessible from the direction of the top surface of said upper slide block.

8. The slidebar assembly of claim 7 wherein the top and bottom slide surfaces of said slidebar are V-shaped runners.

9. The slidebar assembly of claim 7 wherein said hand actuated release means operatively engages the upper and lower slide blocks of said slide block assembly through the guide slot of said slidebar.

10. A slidebar and stem assembly for attaching a handlebar to a frame of a bicycle-like-vehicle comprising a handlebar stem having a split head, an elongated slidebar having a base end, slide means on said slidebar for securing a handlebar transversely thereto and for permitting said handlebar to be adjustably positioned therealong in a slide motion, said slide means including slide release means for releasably securing said slide means in a fixed position along said slidebar, and hand adjustable slidebar pivot support means operative to releasably hold the base end of said slidebar to the handlebar stem at a defined pivot angle relative to said handlebar stem and by which said slidebar can be pivotally adjusted about its base end in relation to said handlebar stem, said slidebar pivot support means including a stem retaining channel for receiving the split head of said handlebar stem and further including cam lock means for releasably expanding the split head of said handlebar stem within the stem retaining channel of said slidebar for locking said slidebar in a fixed pivotal relation to the end of said stem.

11. The slidebar and stem assembly of claim 10 wherein said cam lock means includes and is actuated by a hand accessible cam lock lever on said slidebar.

12. The slidebar and stem assembly of claim 10 wherein said cam lock means includes and is actuated by a hand accessible and hand actuated turn tight bolt on said slidebar.

13. The slidebar and stem assembly of claim 10 wherein the split head of said handlebar stem is formed by two opposed, longitudinally extending split sections of the stem and wherein said cam lock means includes a cam channel formed between said split sections, a cam element disposed in said cam channel and being operatively connected to the base end of said slidebar such that said cam element rotates in said cam channel when said slidebar is pivotally adjusted about its base end, said cam element being adapted to spread the split sections of said stem in said stem retaining channel by a longitudinal movement of said cam element in said cam channel, means accessible from the top of said slidebar for longitudinally moving said cam element within said cam channel for releasably locking the rotational position of said cam element in said cam channel thereby locking the pivot angle of said slidebar in relation to said stem.

14. The slidebar assembly of claim 10 wherein said slide means is comprised of a slide block assembly having a slidebar clamping means operative to hold said slide block assembly in sliding engagement on said slidebar and further having a handlebar clamping means for clamping a handlebar to said slide block assembly in transverse relation to said slidebar.

* * * * *

UNITED STATES PATENT AND TRADEMARK OFFICE
CERTIFICATE OF CORRECTION

PATENT NO. : 5,323,664

DATED : June 28, 1994

INVENTOR(S) : Fairfield, et al

It is certified that error appears in the above—identified patent and that said Letters Patent is hereby corrected as shown below:

Col. 2, line 20, after the word "to" to line 30, should be moved to Col. 1, line 30, after the word "further".

Col. 3, line 5, "ca" should read --can--.

Col. 4, line 51, move "opposed longitudinally extending" to follow after the word "two" in line 52.

Signed and Sealed this

First Day of November, 1994

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,323,664

DATED : June 28, 1994

INVENTOR(S) : Fairfield, et al

It is certified that error appears in the above-indentified patent and that said Letters Patent is hereby corrected as shown below:

Column 1, line 30, after the word "further", to line 58, before the word "disadvantage", should be moved to col. 2, line 20, after the word "to".

Column 2, line 20, after the word "to" to line 30, should be moved to Column 1, line 30, after the word "further".

Column 3, line 5, "ca" should read --can--.

Column 4, line 51, move "opposed longitudinally extending to follow after the word "two" in line 52.

This certificate supersedes Certificate of Correction issued November 1, 1994.

Signed and Sealed this

Fifteenth Day of November, 1994

Attest:

BRUCE LEHMAN

Attesting Officer

Commissioner of Patents and Trademarks